United States Patent Office 3,470,001
Patented Sept. 30, 1969

3,470,001
MASKING COMPOSITION
Anthony J. Koury, 234 Sagamore Road,
Havertown, Pa. 19083
No Drawing. Continuation-in-part of application Ser. No. 446,130, Apr. 6, 1965. This application Dec. 22, 1967, Ser. No. 692,644
Int. Cl. C09d 3/34, 5/20
U.S. Cl. 106—2
9 Claims

ABSTRACT OF THE DISCLOSURE

The subject invention relates to a unique gel-like composition that encapsulates various essential ingredients including lubricants, corrosion inhibitors and acid neutralizers and provides a protective coating or mask for a metallic surface during paint stripping and other metal treating operations.

---

The invention described herein may be manufactured and used by or for the Government of the United States of America for governmental purposes without the payment of any royalties thereon or therefor.

This is a continuation-in-part of patent application Ser. No. 446,130 filed Apr. 6, 1965, now abandoned.

It is known that various types of acid and alkaline paint removing, aluminum brightening and other metal treating compositions and materials often cause stress cracking corrosion and hydrogen embrittlement of high strength steels and other metals when they are not adequately masked or protected. Various types of tapes and masking paper and methods of applying the same have been used in the past to protect critical and sensitive metallic areas during such paint and metal treating operations. Prior masking materials and techniques, however, have been found costly, time consuming and inadequate. Paint removers and other metal treating materials generally readily seep through the tape and masking paper and damage the paint system or metal surface to be protected. It is therefore often necessary to re-mask a given paint or metal surface many times during each paint stripping or metal treating operation to provide reasonable protection.

It is therefore a principal object of the present invention to provide a novel and improved masking composition which is easily applied and which provides effective protection of the masked surface.

It is a further object of the invention to provide a novel and improved masking composition which can be readily applied by hand, brush, grease gun or machine in any inaccessible or other area.

It is a further object of the invention to provide a novel and improved composition which effectively masks a surface to be protected during exposure to a paint stripping or metal treating operation in the form of either a spray or in liquid form as it might collect in a solution collecting area.

It is a further object of the invention to provide a novel and improved stable masking composition which readily adheres to the metallic surface to be protected and does not soften when exposed to alkaline and acid paint removers, and metal brighteners.

It is a further object of the invention to provide a novel and improved masking composition which can be readily used to spot strip paint systems on metal surfaces in various overhaul and repair operations.

It is a further object of the invention to provide a novel and improved masking composition which contains detergents, lubricants, corrosion inhibitors, additives for cold weather and/or acid neutralizers.

These and other objects of the invention are accomplished by preparing a basic formulation that includes petrolatum, a petroleum lubricating oil and a biodegradable detergent. The petrolatum is a purified mixture of semi-solid hydrocarbons, chiefly of the methane series of the general formula $C_nH_{2n+2}$. The petrolatum provides the formulation with the property which permits it to adhere readily to the metallic surface to be masked. The petroleum lubricating oil, which is preferably used, has the following chemical and physical properties:

| | |
|---|---|
| Ash (maximum per cent) | 0.0025 |
| Carbon residue (maximum per cent) | 1.2 |
| Pour point (maximum degrees F.) | 0° |
| Flash point (minimum degrees F.) | 470° |
| Sulfur (maximum per cent) | 0.5 |
| Sediment (maximum ml./100 ml. oil) | 0.005 |
| Saybolt Universal viscosity (maximum at 210° F.) | 125 |
| Kinematic viscosity (cs. maximum at 210° F.) | 26.1 |
| Viscosity index (minimum) | 95 |

Suitable additives may be blended with this lubricating oil to impart oxidation stability and dispersant properties. The petroleum lubricating oil provides the formulation with lubrication, corrosion inhibition, and reduced consistency properties.

Each of the following biodegradable detergents were used in the basic formulation, and were found to render the same easily removable from the protected surface with conventional water based and solvent based cleaners:

| Chemical description | Trade name designation |
|---|---|
| t-Octyl phenol having 12-13 oxyethylene groupings. | Triton X-102 (Rohm & Haas). |
| Primary, straight chain alcohol containing ethylene oxide and propylene oxide and having a viscosity of 60 centipoises at 25° C. | Detergent DN-65 (Rohm & Haas). |
| Nonylphenoxypoly (ethyleneoxy) ethanol. | Igepal CO-630 (Antara Chemicals) |

Ethylene, propylene or hexylene glycol may be added to the above described basic formulation when it is desirable to use the same in cold weather. Similarly, mineral spirits may be added to the basic formulation to reduce its viscosity and to make its removal from the protected surface with a suitable cleaning compound easier. A tertiary alkyl primary amine having 18 to 22 carbon atoms, which is known as Primene JMT (Rohm & Haas), may also be added to the basic formulation to improve its corrosion inhibiting characteristics. An acid neutralizer such as sodium bicarbonate or ammonium hydroxide may also be added at the desired pH to neutralize the acidity of an acid type paint stripper or metal treating composition and reduce still further the possibility of hydrogen embrittlement. Liquid paraffin may be also used with the formulation to improve still further its capacity to adhere to the surface to be protected.

A further understanding of the present invention will be obtained from the following examples which were carried out by coating 1" by 6" steel panels with cadmium plating and various types of paints and lacquers, by partially masking the panels with the below specified compositions, by applying suitable acid and alkaline strippers and by observing the effect of the strippers after several hours on the masked area. In each example, cadmium plated and enamel, acrylic nitrocellulose, cellulose nitrate and fluorescent painted panels were partially masked with the specified composition and the stripper was applied in the form of a spray. After up to several hours, the panels were rinsed with tap water and the masking composition was removed with a water emulsion cleaner. The exposed cadmium plating and paint of the panels were found to be effectively stripped while the paint which had been masked was unaffected.

Example I

| | Parts by wt. |
|---|---|
| Petrolatum | 93 |
| Petroleum lubricating oil (A lubricating oil having the chemical and physical properties described hereinabove was used on each of the examples of this specification.) | 6 |
| Triton X-102 (Rohm & Haas; t-octyl phenol having 12-13 oxyethylene groupings) | 1 |

Example II

| | |
|---|---|
| Petrolatum | 94 |
| Petroleum lubricating oil | 4 |
| Biodegradable detergent DN-65 (Rohm & Haas; modified ethoxylated straight chain alcohol) | 2 |

Example III

| | |
|---|---|
| Petrolatum | 90 |
| Petroleum lubricating oil | 5 |
| Igepal CO-630 (Antara Chemicals; nonylphenoxypolyethyleneoxy ethanol) | 5 |

Example IV

| | |
|---|---|
| Petrolatum | 80.4 |
| Petroleum lubricating oil | 5.4 |
| Triton X-102 (Rohm & Haas) | 5.0 |
| Ethylene glycol | 4.0 |
| Mineral spirits | 5.0 |
| Primiene JMT (Rohm & Haas; tertiary alkyl priming amine) | 0.2 |

Example V

The same as in Example IV with the substitution of 4 parts of propylene glycol in place of the ethylene glycol.

Example VI

The same as in Example IV with the substitution of 4 parts of hexylene glycol in place of the ethylene glycol.

Example VII

| | |
|---|---|
| Petrolatum | 84.4 |
| Petroleum lubricating oil | 5.4 |
| Triton X-102 (Rohm & Haas) | 5.0 |
| Mineral spirits | 5.0 |
| Primene JMT (Rohm & Haas) | 0.2 |

Example VIII

| | |
|---|---|
| Petrolatum | 86.5 |
| Petroleum lubricating oil | 4.5 |
| Triton X-102 (Rohm & Haas) | 3.8 |
| Primene JMT (Rohm & Haas) | 0.2 |
| Sodium bicarbonate | 5.0 |

Example IX

| | |
|---|---|
| Paraffin | 4.5 |
| Petrolatum | 82.0 |
| Petroleum lubricating oil | 4.5 |
| Triton X-102 (Rohm & Haas) | 3.8 |
| Primene JMT (Rohm & Haas) | 0.2 |
| Sodium bicarbonate | 5.0 |

Example X

| | |
|---|---|
| Petrolatum | 91.8 |
| Petroleum lubricating oil | 5.0 |
| Triton X-102 (Rohm & Haas) | 2.0 |
| Mineral spirits | 1.0 |
| Primene JMT (Rohm & Haas) | 0.2 |

Example XI

| | |
|---|---|
| Petrolatum | 86.5 |
| Petroleum lubricating oil | 4.5 |
| Triton X-102 (Rohm & Haas) | 3.8 |
| Primene JMT (Rohm & Haas) | 1.0 |
| Sodium bicarbonate | 4.2 |

What I claim is:

1. A composition for use in masking metallic surfaces during paint stripping and other metal treating operations consisting essentially of:
   (a) about from 80 to 93 parts by weight of petrolatum;
   (b) about 4 to 6 parts by weight of petroleum lubricating oil;
   (c) from 2 to 5 parts by weight of a detergent selected from the group of detergents consisting of t-octyl phenol having 12-13 polyoxyethylene groupings, a primary, straight chain alcohol containing ethylene oxide and propylene oxide and having a viscosity of 60 centipoises at 25° C., and nonylphenoxypoly ethyleneoxy ethanol;
   (d) about from 0 to 4 parts by weight of a glycol selected from the group of gylcols consisting of ethylene glycol, propylene glycol and hexylene glycol;
   (e) about from 0 to 5 parts by weight of mineral spirits;
   (f) about from 0 to 1 parts by weight of tertiary alkyl primary amine having 18 to 22 carbon atoms; and
   (g) about from 0 to 5 parts by weight of an acid neutralizer selected from the group of acid neutralizers consisting of sodium bicarbonate and ammonium hydroxide.

2. A masking composition as claimed in claim 1 wherein said determent is t-octyl phenol having 12-13 polyoxyethylene groupings.

3. A masking composition as claimed in claim 1 wherein said detergent is the primary straight chain alcohol containing ethylene oxide and propylene oxide and having a viscosity of 60° centipoises at 25° C.

4. A masking composition as claimed in claim 1 wherein said detergent is nonylphenoxypoly ethyleneoxy ethanol.

5. A masking composition as claimed in claim 1 wherein said glycol is ethylene glycol.

6. A masking composition as claimed in claim 1 wherein said glycol is propylene glycol.

7. A masking composition as claimed in claim 1 wherein said glycol is hexylene glycol.

8. A masking composition as claimed in claim 1 wherein said acid neutralizer is sodium bicarbonate.

9. A masking composition as claimed in claim 1 wherein said acid neutralizer is ammonium hydroxide.

References Cited

UNITED STATES PATENTS

| | | | |
|---|---|---|---|
| 2,661,296 | 12/1953 | Schiermeier et al. | 106—14 |
| 2,834,731 | 5/1958 | Carpenter | 106—311 XR |
| 2,873,195 | 2/1959 | Ganzler et al. | 106—14 |
| 2,928,752 | 3/1960 | Felletschin | 106—285 XR |
| 2,932,576 | 4/1960 | Vierk et al. | 106—285 XR |
| 2,943,945 | 7/1960 | Saywell | 106—285 XR |
| 2,968,621 | 1/1961 | Teeter et al. | |
| 3,285,755 | 11/1966 | Airola | 106—285 XR |

OTHER REFERENCES

Zimmerman et al., Handbook of Material Trade Names, Supplement I, New Hampshire, Industrial Research Service Inc.; TP 151 25, 1953, C. 9, p. 193 ("Primene" and "Priminox").

JULIUS FROME, Primary Examiner

JOAN B. EVANS, Assistant Examiner

U.S. Cl. X.R.

21—60.5; 106—14, 271, 285, 311; 117—127; 134—38; 148—6; 252—62.3, 315, 390, 393